United States Patent
Nallampatti Ekambaram et al.

(10) Patent No.: US 10,132,933 B2
(45) Date of Patent: Nov. 20, 2018

(54) ALIGNMENT OF VISUAL INERTIAL ODOMETRY AND SATELLITE POSITIONING SYSTEM REFERENCE FRAMES

(71) Applicant: QUALCOMM Incorporated, San Diego, CA (US)

(72) Inventors: Venkatesan Nallampatti Ekambaram, Somerville, NJ (US); Jubin Jose, Belle Mead, NJ (US); Urs Niesen, Summit, NJ (US); Xinzhou Wu, Hillsborough, NJ (US); Lionel Jacques Garin, Palo Alto, CA (US)

(73) Assignee: QUALCOMM Incorporated, San Diego, CA (US)

( * ) Notice: Subject to any disclaimer, the term of this patent is extended or adjusted under 35 U.S.C. 154(b) by 345 days.

(21) Appl. No.: 15/014,004

(22) Filed: Feb. 2, 2016

(65) Prior Publication Data
US 2017/0219717 A1 Aug. 3, 2017

(51) Int. Cl.
*G01S 19/53* (2010.01)
*G01C 21/16* (2006.01)
(Continued)

(52) U.S. Cl.
CPC ............ *G01S 19/53* (2013.01); *G01C 21/165* (2013.01); *G01S 11/12* (2013.01); *G01S 19/42* (2013.01);
(Continued)

(58) Field of Classification Search
CPC ....... G01S 19/52; G01S 19/53; G01C 21/165; G06T 7/70
See application file for complete search history.

(56) References Cited

U.S. PATENT DOCUMENTS 4,402,049 A * 8/1983 Gray .................... G01C 21/165
701/466
5,672,872 A * 9/1997 Wu ......................... F41G 3/326
250/330
(Continued)

FOREIGN PATENT DOCUMENTS

JP 2013170904 A 9/2013
WO 2015077514 A1 5/2015

OTHER PUBLICATIONS

Roberts, P. et al."Fixed Wing UAV Navigation and Control through Integrated GNSS and Vision." AIAA Guidance, Navigation, and Control Conference and Exhibit Aug. 15-18, 2005, San Francisco, California. pp. 1-13. (Year: 2005).*
(Continued)

*Primary Examiner* — Gregory C. Issing
(74) *Attorney, Agent, or Firm* — Muncy, Geissler, Olds & Lowe, P.C.

(57) ABSTRACT

A method for aligning visual-inertial odometry (VIO) and satellite positioning system (SPS) reference frames includes obtaining a plurality of range-rate measurements of a mobile platform from an SPS. The range-rate measurements are with respect to a global reference frame of the SPS. The method also includes obtaining a plurality of VIO velocity measurements of the mobile platform from a VIO system. The VIO velocity measurements are with respect to a local reference frame of the VIO system. At least one orientation parameter is then determined to align the local reference frame with the global reference frame based on the range-rate measurements and the VIO velocity measurements.

34 Claims, 4 Drawing Sheets

(51) Int. Cl.
G01S 19/42 (2010.01)
G01S 19/52 (2010.01)
G01S 11/12 (2006.01)
G01S 19/47 (2010.01)
G01S 5/16 (2006.01)

(52) U.S. Cl.
CPC .............. *G01S 19/52* (2013.01); *G01S 5/163* (2013.01); *G01S 19/47* (2013.01)

(56) References Cited

U.S. PATENT DOCUMENTS

| | | | | |
|---|---|---|---|---|
| 5,894,323 | A * | 4/1999 | Kain | G01C 11/02 348/116 |
| 7,346,452 | B2 * | 3/2008 | Ford | G01C 21/165 342/357.32 |
| 8,855,929 | B2 * | 10/2014 | Zhang | G01C 21/165 701/480 |
| 2009/0248304 | A1 | 10/2009 | Roumeliotis et al. | |
| 2012/0127030 | A1 * | 5/2012 | Arthur | G01S 19/45 342/357.28 |
| 2012/0176492 | A1 * | 7/2012 | Garin | H04N 7/18 348/116 |
| 2015/0219767 | A1 | 8/2015 | Humphreys et al. | |

OTHER PUBLICATIONS

Ben Afia, et al. "A Low-cost GNSS/IMU/Visual monoSLAM/WSS Integration Based on Federated Kalman Filtering for Navigation in Urban Environments." 28th International Technical Meeting of the Satellite Division of the Institute of Navigation, Sep. 2015, Tampa, FL. pp. 618-628. (Year: 2015).*

Aumeyer, B. "Ultra-tightly Coupled Vision/GNSS for Automotive Applications." Graduate Program in Geomatics Engineering Calgary, Alberta. Jan. 2016. pp. 1-207. (Year: 2016).*

Chu, T. et al. "Monocular Camera/IMU/GNSS Integration for Ground Vehicle Navigation in Challenging GNSS Environments". sensors ISSN 1424-8220, www.mdpi.com/journal/sensors. Mar. 2012. pp. 1-24. (Year: 2012).*

Iafrancesco, M. "GPS/INS Tightly Coupled Position and Attitude Determination with Low-Cost Sensors." Master Thsesi. Institute for Communications and Navigation. Munich, Sep. 2015. pp. 1-65. (Year: 2015).*

Agrawal M., et al., "Real-time Localization in Outdoor Environments using Stereo Vision and Inexpensive GPS," 2006, 6 pages.

Angelino C.V., et al., "UAV Position and Attitude Estimation using IMU, GNSS and Camera", 15th International Conference on Information Fusion (FUSION), IEEE, Jul. 9, 2012 (Jul. 9, 2012), pp. 735-742, XP032228491, ISBN: 978-1-4673-0417-7.

Drevelle V., et al., "Robust Positioning Using Relaxed Constraint-Propagation", IEEE/RSJ International Conference on Intelligent Robots and Systems (IROS), Piscataway, NJ, USA, Oct. 18, 2010 (Oct. 18, 2010), pp. 4843-4848, XP031920198, DOI: 10.1109/IROS. 201 0.5649794, ISBN: 978-1-4244-6674-0.

International Search Report and Written Opinion—PCT/US2017/014344—ISA/EPO—Jul. 13, 2017.

Mahony R., et al., "Nonlinear Attitude Observers on SO(3) for Complementary and Compatible Measurements: A Theoretical Study", Proceedings of the 48th IEEE Conference on Decision and Control, 2009 held jointly with the 2009 28th Chinese Control Conference, CDC/CCC 2009, IEEE, Piscataway, NJ, USA, Dec. 15, 2009 (Dec. 15, 2009), pp. 6407-6412, XP031619572, ISBN: 978-1-4244-3871-6.

Niesen U., et al., "Robust Positioning from Visual-Inertial and GPS Measurements", GNSS 2016—Proceedings of the 29th International Technical Meeting of the Satellite Division of the Institute of Navigation (ION GNSS+ 2016), The Institute of Navigation, 8551 Rixlew Lane Suite 360, Manassas, VA 20109, USA, Sep. 16, 2016 (Sep. 16, 2016), pp. 788-793, XP056013714.

Partial International Search Report—PCT/US2017/014344—ISA/EPO—May 12, 2017.

* cited by examiner

ALIGNMENT OF VISUAL INERTIAL ODOMETRY AND SATELLITE POSITIONING SYSTEM REFERENCE FRAMES

FIELD OF DISCLOSURE

This disclosure relates generally to the use of satellite positioning systems (SPS), and in particular, but not exclusively, relates to the alignment of visual inertial odometry (VIO) reference frame with an SPS reference frame.

BACKGROUND

Mobile platforms offer increasingly sophisticated capabilities associated with the motion and/or position location sensing of the mobile platform. New software applications, such as, for example, those related to personal productivity, collaborative communications, social networking, and/or data acquisition, may utilize motion and/or position sensors to provide new features and services to consumers.

Such motion and/or position determination capabilities may be provided using Satellite Positioning Systems (SPS). However, position determinations based on SPS measurements may have inherent errors on the order of a few meters. Such accuracy may not be sufficient for certain applications. In mobile platforms, position accuracy can be improved by augmenting measurements derived from SPS with other available sensors/systems. For example, position determinations for an SPS included in a vehicle may be supplemented by a mechanical odometer. The mechanical odometer may provide odometry data from the movement of actuators, such as a rotary encoder, to estimate a change in position of the vehicle over time. The odometry data may then be combined with SPS data to improve position determinations. However, the mechanical odometer may suffer from precision problems, since wheels of the vehicle may slip and slide on the road/surface creating a non-uniform distance traveled as compared to odometer data that is based on wheel rotations. This error may be compounded when the vehicle operates on a non-smooth surface. Such mechanical odometer data may become increasingly unreliable as these errors accumulate and compound over time.

SUMMARY

The following presents a simplified summary relating to one or more aspects and/or embodiments associated with the mechanisms disclosed herein to align a visual-inertial odometry (VIO) reference frame with a satellite positioning system (SPS) reference frame. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary presents certain concepts relating to one or more aspects and/or embodiments relating to the mechanisms disclosed herein to align a visual-inertial odometry (VIO) reference frame with a satellite positioning system (SPS) reference frame in a simplified form to precede the detailed description presented below.

According to one aspect, a method for aligning visual-inertial odometry (VIO) and satellite positioning system (SPS) reference frames includes obtaining a plurality of range-rate measurements of a mobile platform from an SPS. The range-rate measurements are with respect to a global reference frame of the SPS. The method also includes obtaining a plurality of VIO velocity measurements of the mobile platform from a VIO system. The VIO velocity measurements are with respect to a local reference frame of the VIO system. At least one orientation parameter is then determined to align the local reference frame with the global reference frame based on the range-rate measurements and the VIO velocity measurements.

According to another aspect, an apparatus for aligning visual-inertial odometry (VIO) and satellite positioning system (SPS) reference frames includes means for obtaining a plurality of range-rate measurements of a mobile platform from a satellite positioning system (SPS), where the plurality of range-rate measurements are with respect to a global reference frame of the SPS. The apparatus also includes means for obtaining a plurality of visual-inertial odometry (VIO) velocity measurements of the mobile platform from a VIO system, where the plurality of VIO velocity measurements are with respect to a local reference frame of the VIO system. The apparatus further includes means for determining at least one orientation parameter to align the local reference frame with the global reference frame based on the plurality of range-rate measurements and the plurality of VIO velocity measurements.

According to yet another aspect, an apparatus for aligning visual-inertial odometry (VIO) and satellite positioning system (SPS) reference frames includes at least one processor and at least one memory coupled to the at least one processor. The at least one processor and the at least one memory are configured to direct the apparatus to: (i) obtain a plurality of range-rate measurements of a mobile platform from a satellite positioning system (SPS), where the plurality of range-rate measurements are with respect to a global reference frame of the SPS; (ii) obtain a plurality of visual-inertial odometry (VIO) velocity measurements of the mobile platform from a VIO system, where the plurality of VIO velocity measurements are with respect to a local reference frame of the VIO system; and (iii) determine at least one orientation parameter to align the local reference frame with the global reference frame based on the plurality of range-rate measurements and the plurality of VIO velocity measurements.

According to another aspect, a non-transitory computer-readable storage medium includes computer-executable instructions recorded thereon. Executing the computer-executable instructions on one or more processors causes the one or more processors to: (i) obtain a plurality of range-rate measurements of a mobile platform from a satellite positioning system (SPS), where the plurality of range-rate measurements are with respect to a global reference frame of the SPS; (ii) obtain a plurality of visual-inertial odometry (VIO) velocity measurements of the mobile platform from a VIO system, where the plurality of VIO velocity measurements are with respect to a local reference frame of the VIO system; and (iii) determine at least one orientation parameter to align the local reference frame with the global reference frame based on the plurality of range-rate measurements and the plurality of VIO velocity measurements.

Other objects and advantages associated with the mechanisms disclosed herein to align a visual-inertial odometry (VIO) reference frame with a satellite positioning system (SPS) reference frame described herein will be apparent to those skilled in the art based on the accompanying drawings and detailed description.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which.

DETAILED DESCRIPTION

Various aspects are disclosed in the following description and related drawings. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

The terminology used herein is for the purpose of describing particular embodiments only and not to limit any embodiments disclosed herein. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It will be recognized that various actions described herein can be performed by specific circuits (e.g., an application specific integrated circuit (ASIC)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Figure 1:
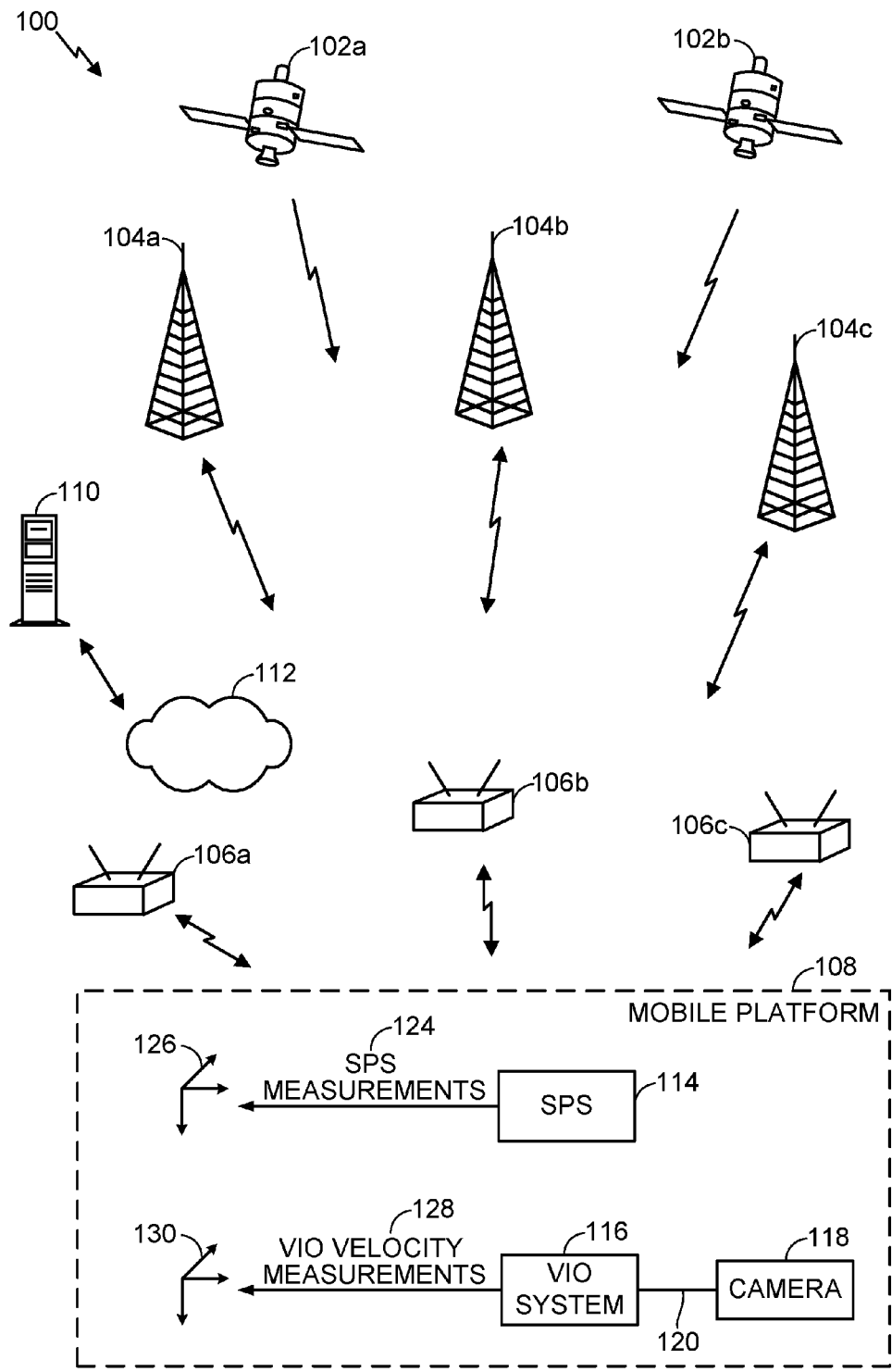
FIG. 1 illustrates an example operating environment for a mobile platform that can determine position using one or more techniques, according to one aspect of the disclosure.

According to one aspect of the disclosure, FIG. 1 illustrates an exemplary operating environment 100 for a mobile platform 108 that can determine its position using one or more techniques. Embodiments are directed to a mobile platform 108 which may determine its position utilizing data from both a Satellite Positioning System (SPS) 114 and a Visual Inertial Odometer (VIO) system 116. The SPS measurements 124 generated by the SPS 114 may include one or more range-rate measurements (e.g., GPS Doppler measurements) and/or one or more SPS velocity measurements that are representative of a velocity of the mobile platform 108.

The VIO system 116 utilizes several sequential images 120 captured by a camera 118 to estimate a relative position, velocity, acceleration, and/or orientation of the mobile platform 108. The camera 118 may include a single monocular camera, a stereo camera, and/or an omnidirectional camera. In operation, the VIO system 116 acquires the images 120 generated by the camera 118 in order to generate the VIO velocity measurements 128. In one aspect, the VIO system 116 may apply one or more image processing techniques to the images 120, detect one or more features, match those features across multiple frames to construct an optical flow, and estimate motion of the mobile platform 108 based on the optical flow. The VIO system 116 then generates VIO velocity measurements 128 that represent an estimated velocity of the mobile platform 108 based on the estimated motion.

By combining the VIO velocity measurements 128 with the SPS measurements 124, the mobile platform 108 may increase the accuracy of position determinations of the mobile platform 108. However, the SPS measurements 124 and the VIO velocity measurements 128 may be each made with respect to separate coordinate systems. For example, the SPS measurements 124 may be with respect to a global reference frame 126, such as an Earth-Centered, Earth-Fixed (ECEF) coordinate system, such as the WGS84 coordinate system used with GPS, while the VIO velocity measurements 128 may be with respect to a separate local reference frame 130. While the global reference frame 126 may be known and common to any system using the same satellite positioning network, the local reference frame 130 may depend, in part, on the specific orientation of the mobile platform 108. That is, the local reference frame 130 may change depending on the position and/or orientation of the mobile platform 108 within environment 100. Thus, in order to combine the VIO velocity measurements 128 with the SPS measurements 124, the mobile platform 108 may align local reference frame 130 with the global reference frame 126. In one aspect, the mobile platform 108 determines one or more orientation parameters (e.g., rotation matrix) to align the local reference frame 130 with the global reference frame 126 based solely on the SPS measurements 124 and the VIO velocity measurements 128. These and other aspects will be described in more detail below.

The operating environment 100 may contain one or more different types of wireless communication systems and/or wireless positioning systems. In the embodiment shown in FIG. 1, one or more Satellite Positioning System (SPS) satellites 102a, 102b may be used as an independent source of position information for the mobile platform 108. The SPS 114 of mobile platform 108 may include one or more dedicated SPS receivers specifically designed to receive signals for deriving geo-location information from the SPS satellites 102a, 102b.

The operating environment 100 may also include one or more Wide Area Network Wireless Access Points (WAN-WAPs) 104a, 104b, 104c, which may be used for wireless voice and/or data communication, and as another source of independent position information for the mobile platform 108. The WAN-WAPs 104a-104c may be part of a wide area wireless network (WWAN), which may include cellular base stations at known locations, and/or other wide area wireless systems, such as, for example, Worldwide Interoperability for Microwave Access (WiMAX) (e.g., IEEE 802.16). The WWAN may include other known network components which are not shown in FIG. 1 for simplicity. Typically, each of the WAN-WAPs 104a-104c within the WWAN may operate from fixed positions, and provide network coverage over large metropolitan and/or regional areas.

The operating environment 100 may further include one or more Local Area Network Wireless Access Points (LAN-WAPs) 106a, 106b, 106c, which may be used for wireless voice and/or data communication, as well as another independent source of position data. The LAN-WAPs can be part of a Wireless Local Area Network (WLAN), which may operate in buildings and perform communications over smaller geographic regions than a WWAN. Such LAN-WAPs 106a-106c may be part of, for example, Wi-Fi networks (802.11x), cellular piconets and/or femtocells, Bluetooth networks, etc.

The mobile platform 108 may derive position information from any one or more of the SPS satellites 102a, 102b, the WAN-WAPs 104a-104c, and/or the LAN-WAPs 106a-106c. Each of the aforementioned systems can provide an independent estimate of the position for the mobile platform 108 using different techniques. In some embodiments, the mobile platform 108 may combine the solutions derived from each of the different types of access points to improve the accuracy of the position data. When deriving position using the SPS satellites 102a, 102b, the mobile platform 108 may utilize a receiver specifically designed for use with the SPS that extracts position, using conventional techniques, from a plurality of signals transmitted by SPS satellites 102a, 102b.

SPS satellites 102a and 102b are part of a satellite system that typically includes a system of transmitters positioned to enable entities to determine their location on or above the Earth based, at least in part, on signals received from the transmitters. Such a transmitter typically transmits a signal marked with a repeating pseudo-random noise (PN) code of a set number of chips and may be located on ground-based control stations, user equipment and/or space vehicles. In a particular example, such transmitters may be located on Earth orbiting satellite vehicles (SVs). For example, a SV in a constellation of Global Navigation Satellite System (GNSS) such as Global Positioning System (GPS), Galileo, Glonass or Compass may transmit a signal marked with a PN code that is distinguishable from PN codes transmitted by other SVs in the constellation (e.g., using different PN codes for each satellite as in GPS or using the same code on different frequencies as in Glonass). In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein satellite systems used herein may include any combination of one or more global and/or regional navigation satellite systems and/or augmentation systems, and SPS signals may include SPS, SPS-like, and/or other signals associated with such one or more SPS.

Furthermore, the disclosed method and apparatus may be used with positioning determination systems that utilize pseudolites or a combination of satellites and pseudolites. Pseudolites are ground-based transmitters that broadcast a PN code or other ranging code (similar to a GPS or CDMA cellular signal) modulated on an L-band (or other frequency) carrier signal, which may be synchronized with GPS time. Each such transmitter may be assigned a unique PN code so as to permit identification by a remote receiver. Pseudolites are useful in situations where GPS signals from an orbiting satellite might be unavailable, such as in tunnels, mines, buildings, urban canyons or other enclosed areas. Another implementation of pseudolites is known as radio-beacons. The term "satellite", as used herein, is intended to include pseudolites, equivalents of pseudolites, and possibly others. The term "SPS signals," as used herein, is intended to include SPS-like signals from pseudolites or equivalents of pseudolites.

When deriving position from the WWAN, each WAN-WAPs 104a-104c may take the form of base stations within a digital cellular network, and the mobile platform 108 may include a cellular transceiver and processor that can exploit the base station signals to derive position. Such cellular networks may include, but are not limited to, standards in accordance with GSM, CMDA, 2G, 3G, 4G, LTE, etc. It should be understood that digital cellular network may include additional base stations or other resources that may not be shown in FIG. 1. While WAN-WAPs 104a-104c may actually be moveable or otherwise capable of being relocated, for illustration purposes it will be assumed that they are essentially arranged in a fixed position.

The mobile platform 108 may perform position determination using known time-of-arrival (TOA) techniques such as, for example, Advanced Forward Link Trilateration (AFLT). In other embodiments, each WAN-WAP 104a-104c may comprise a WiMAX wireless networking base station. In this case, the mobile platform 108 may determine its position using TOA techniques from signals provided by the WAN-WAPs 104a-104c. The mobile platform 108 may determine positions either in a stand-alone mode, or using the assistance of a positioning server 110 and network 112 using TOA techniques. Furthermore, various embodiments may have the mobile platform 108 determine position information using WAN-WAPs 104a-104c, which may have different types. For example, some WAN-WAPs 104a-104c may be cellular base stations, and other WAN-WAPs 104a-104c may be WiMAX base stations. In such an operating environment, the mobile platform 108 may be able to exploit the signals from each different type of WAN-WAP 104a-104c, and further combine the derived position solutions to improve accuracy.

When deriving position using the WLAN, the mobile platform 108 may utilize TOA techniques with the assistance of the positioning server 110 and the network 112. The positioning server 110 may communicate to the mobile platform 108 through network 112. Network 112 may include a combination of wired and wireless networks which incorporate the LAN-WAPs 106a-106c. In one embodiment, each LAN-WAP 106a-106c may be, for example, a Wi-Fi wireless access point, which is not necessarily set in a fixed position and can change location. The position of each LAN-WAP 106a-106c may be stored in the positioning server 110 in a common coordinate system. In one embodiment, the position of the mobile platform 108 may be determined by having the mobile platform 108 receive signals from each LAN-WAP 106a-106c. Each signal may be associated with its originating LAN-WAP based upon some form of identifying information that may be included in the received signal (such as, for example, a MAC address). The mobile platform 108 may then sort the received signals based upon signal strength, and derive the time delays associated with each of the sorted received signals. The mobile platform 108 may then form a message which can include the time delays and the identifying information of each of the LAN-WAPs, and send the message via network 112 to the positioning sever 110. Based upon the received message, the positioning server 110 may then determine a position, using the stored locations of the relevant LAN-WAPs 106a-106c, of the mobile platform 108. The positioning server 110 may generate and provide a Location Configuration Indication (LCI) message to the mobile platform 108 that includes a pointer to the position of the mobile platform 108 in a local coordinate system. The LCI message may also include other points of interest in relation to the location of the mobile platform 108. When computing the position of the mobile platform 108, the positioning server 110 may take into account the different delays which can be introduced by elements within the wireless network.

The position determination techniques described above may be used for various wireless communication networks such as a WWAN, a WLAN, a wireless personal area network (WPAN), and so on. The term "network" and "system" may be used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX (IEEE 802.16) network, and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be used for any combination of a WWAN, WLAN and/or WPAN.

As used herein, mobile platform 108 may be a device such as a vehicle (manned or unmanned), a robot, a cellular or other wireless communication device, personal communication system (PCS) device, personal navigation device, Personal Information Manager (PIM), Personal Digital Assistant (PDA), laptop or other suitable mobile device that is capable of capturing images and navigating using internal sensors. The term "mobile platform" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile platform" is intended to include all devices, including wireless communication devices, computers, laptops, etc. which are capable of communication with a server, such as via the Internet, Wi-Fi, or other network, and regardless of whether satellite signal reception, assistance data reception, and/or position-related processing occurs at the device, at a server, or at another device associated with the network. Any operable combination of the above is also considered a "mobile platform."

Furthermore, in one embodiment, the mobile platform 108 may be suitably linked to a vehicle through one or more communication interfaces (e.g., a Bluetooth interface, an RF antenna, a wired connection, etc.) that enable the mobile platform 108 to read SPS measurements 124 and/or VIO velocity measurements obtained by the vehicle, itself. Furthermore, an application program interface (API) that supports communication between the mobile platform 108 and a vehicle may make the SPS measurements 124 and/or VIO velocity measurements 128, obtained by the vehicle, available to the mobile platform 108.

Figure 2:
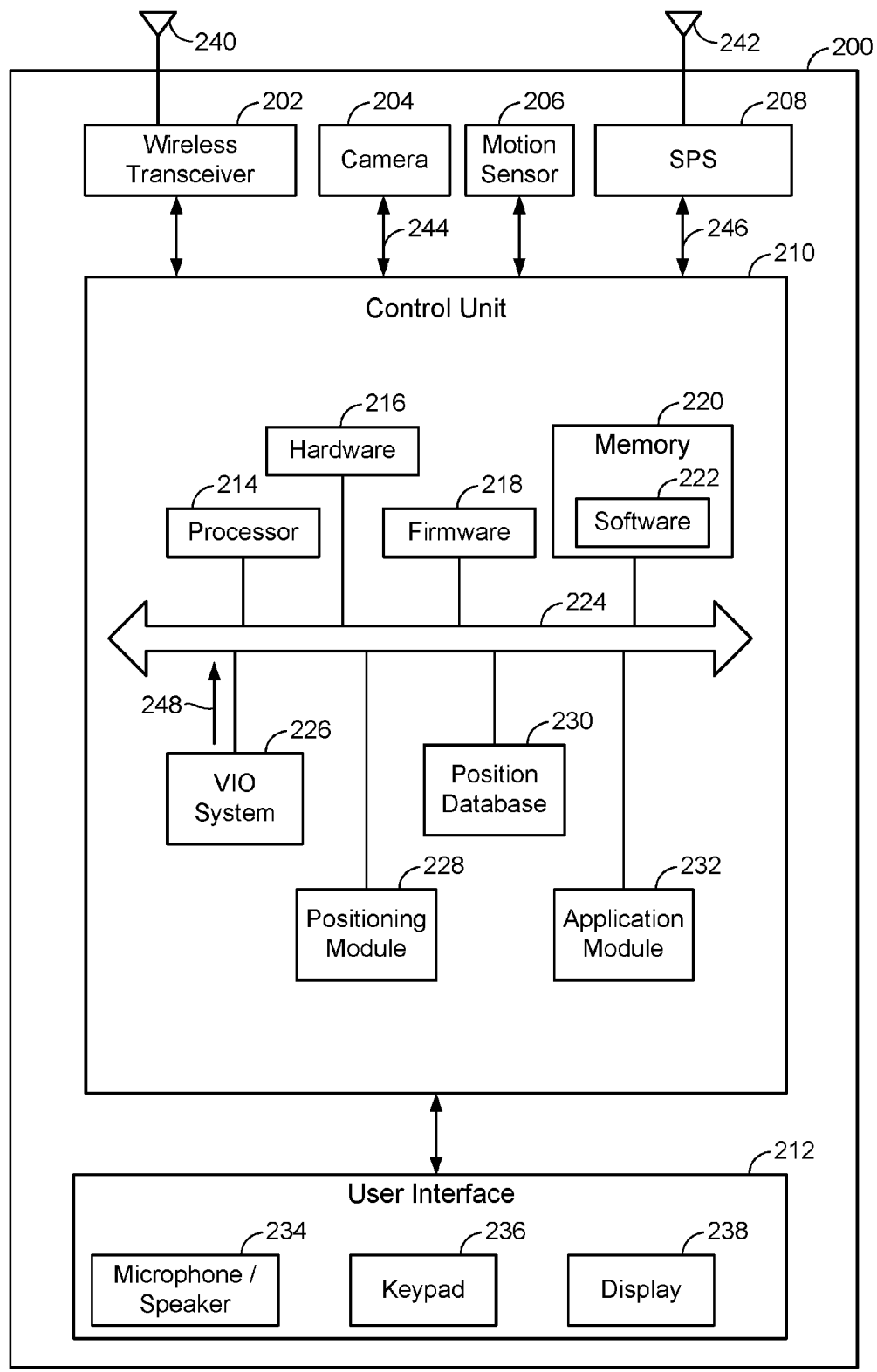
FIG. 2 illustrates an example mobile platform that may be used in an operating environment that can determine position using one or more techniques, according to one aspect of the disclosure.

FIG. 2 illustrates an example mobile platform 200 that may be used in an operating environment 100 that can determine position using one or more techniques, according to one aspect of the disclosure. Mobile platform 200 is one possible implementation of mobile platform 108 of FIG. 1.

The various features and functions illustrated in the diagram of FIG. 2 are connected together using a common data bus 224 which is meant to represent that these various features and functions are operatively coupled together. Those skilled in the art will recognize that other connections, mechanisms, features, functions, or the like, may be provided and adapted as necessary to operatively couple and configure an actual portable device. Further, it is also recognized that one or more of the features or functions illustrated in the example of FIG. 2 may be further subdivided or two or more of the features or functions illustrated in FIG. 2 may be combined.

The mobile platform 200 may include one or more wireless transceivers 202 that may be connected to one or more antennas 240. The wireless transceiver 202 may include suitable devices, hardware, and/or software for communicating with and/or detecting signals to/from WAN-WAPs 104a-104c, and/or directly with other wireless devices within a network. For example, the wireless transceiver 202 may comprise a CDMA communication system suitable for communicating with a CDMA network of wireless base stations; however in other aspects, the wireless communication system may comprise another type of cellular telephony network, such as, for example, TDMA or GSM. Additionally, any other type of wide area wireless networking technologies may be used, for example, WiMAX (IEEE 802.16), etc. The wireless transceiver 202 may also include one or more local area network (LAN) transceivers that may be connected to one or more antennas 240. For example, the wireless transceiver 202 may include suitable devices, hardware, and/or software for communicating with and/or detecting signals to/from LAN-WAPs 106a-106c, and/or directly with other wireless devices within a network. In one aspect, the wireless transceiver 202 may include a Wi-Fi (802.11x) communication system suitable for communicating with one or more wireless access points; however in other aspects, the wireless transceiver 202 comprise another type of local area network, personal area network, (e.g., Bluetooth). Additionally, any other type of wireless networking technologies may be used, for example, Ultra Wide Band, ZigBee, wireless USB etc.

As used herein, the abbreviated term "wireless access point" (WAP) may be used to refer to LAN-WAPs 106a-106c and/or WAN-WAPs 104a-104c. Specifically, when the term "WAP" is used, it should be understood that embodiments may include a mobile platform 200 that can exploit signals from a plurality of LAN-WAPs 106a-106c, a plurality of WAN-WAPs 104a-104c, or any combination of the two. The specific type of WAP being utilized by the mobile platform 200 may depend upon the environment of operation. Moreover, the mobile platform 200 may dynamically select between the various types of WAPs in order to arrive at an accurate position solution. In other embodiments, various network elements may operate in a peer-to-peer manner, whereby, for example, the mobile platform 200 may be replaced with the WAP, or vice versa. Other peer-to-peer embodiments may include another mobile platform (not shown) acting in place of one or more WAP.

As shown in FIG. 2, mobile platform 200 may also include a camera 204. Camera 204 may be a single monocular camera, a stereo camera, and/or an omnidirectional camera. In one aspect, camera 204 is calibrated such that the camera parameters (e.g., focal length, displacement of the optic center, radial distortion, tangential distortion, etc.) are known. Camera 204 is coupled to control unit 210 to provide images 244 to the control unit 210.

The illustrated example of mobile platform 200 also includes a motion sensor 206. Motion sensor 206 may be coupled to control unit 210 to provide movement and/or orientation information which is independent of motion data derived from signals received by the wireless transceiver 202, the SPS 208, and the VIO system 226.

By way of example, the motion sensor 206 may include an accelerometer (e.g., a MEMS device), a gyroscope, a geomagnetic sensor (e.g., a compass), an altimeter (e.g., a barometric pressure altimeter), and/or any other type of movement detection sensor. Moreover, the motion sensor 206 may include a plurality of different types of devices and combine their outputs in order to provide motion information. For example, the motion sensor 206 may use a combination of a multi-axis accelerometer and orientation sensors to provide the ability to compute positions in 2-D and/or 3-D coordinate systems.

A Satellite Positioning System (SPS) 208 may also be included in the mobile platform 200. The SPS 208 may be connected to the one or more antennas 242 for receiving satellite signals. The SPS 208 may comprise any suitable hardware and/or software for receiving and processing SPS signals. The SPS 208 requests information and operations as appropriate from the other systems, and performs the calculations necessary to determine the mobile platforms 200 position using measurements obtained by any suitable SPS algorithm. In one aspect, SPS 208 is coupled to control unit 210 to provide one or more SPS measurements 246 to the control unit 210. In one example, the SPS measurements 246 are range-rate measurements, such as GPS Doppler range-rate measurements. In another example, SPS 208 is configured to determine an SPS velocity of the mobile platform 200 based on the range-rate measurements such that the SPS measurements 246 are the SPS velocity measurements. That is, SPS measurements 246 may include the range-rate measurements by themselves, the SPS velocity measurements by themselves, and/or any combination of the two.

Mobile Platform 200 also includes a control unit 210 that is connected to and communicates with the wireless transceiver 202, the camera 204, the motion sensor 206, the SPS 208, and user interface 212, if present. In one aspect, the control unit 210 accepts and processes images 244 received from the camera 204 as well as SPS measurements 246 received from SPS 208. Control unit 210 may be provided by a processor 214 and associated memory 220, hardware 216, firmware 218, and software 222.

The processor 214 may include one or more microprocessors, microcontrollers, and/or digital signal processors that provide processing functions, as well as other calculation and control functionality. The processor 214 may also include memory 220 for storing data and software instructions for executing programmed functionality within the mobile platform 200. The memory 220 may be on-board the processor 214 (e.g., within the same IC package), and/or the memory may be external memory to the processor 214 and functionally coupled over data bus 224. The functional details associated with aspects of the disclosure will be discussed in more detail below.

Control unit 210 may further include a Visual Inertial Odometry (VIO) system 226, a positioning module 228, a position database 230, and an application module 232. VIO system 226 may be configured to generate VIO velocity measurements 248 in response to the images 244 received from camera 204. The positioning module 228 may be configured to determine a position of the mobile platform based on one or more positioning techniques. As will be discussed in more detail below, positioning module 228 may be configured to determine a position of the mobile platform 200 by combining the VIO velocity measurements 248 with the SPS measurements 246. The position database 232 may be configured to store and update the position and/or orientation of the mobile platform 200. That is, as the control unit 210 determines a new position and/or orientation of the mobile platform 200, the position database 230 may be updated. The updated position and orientation information may then be provided, e.g., by displaying a digital map with the new position on the display 238 or by providing additional navigation instructions on the display and/or via speaker 234.

The application module 232 may be a process running on the processor 214 of the mobile platform 200, which requests position information from the positioning module 228. Applications typically run within an upper layer of the software architectures, and may include Indoor/Outdoor Navigation, Buddy Locator, Shopping and Coupons, Asset Tracking, and location Aware Service Discovery.

Processor 214, VIO system 226, positioning module 228, and position database 230 are illustrated separately for clarity, but may be a single unit and/or implemented in the processor 214 based on instructions in the software 222 which is run in the processor 214. Processor 214, VIO system 226, positioning module 228 can, but need not necessarily include, one or more microprocessors, embedded processors, controllers, application specific integrated circuits (ASICs), digital signal processors (DSPs), and the like. The term processor describes the functions implemented by the system rather than specific hardware. Moreover, as used herein the term "memory" refers to any type of computer storage medium, including long term, short term, or other memory associated with mobile platform 200, and is not to be limited to any particular type of memory or number of memories, or type of media upon which memory is stored.

The processes described herein may be implemented by various means depending upon the application. For example, these processes may be implemented in hardware 216, firmware 218, processor 214 in combination with software 222, or any combination thereof. For a hardware implementation, the processor 214 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or processor/software implementation, the processes may be implemented with modules (e.g., procedures, functions, and so on) that perform the functions described herein. Any non-transitory computer-readable medium tangibly embodying instructions may be used in implementing the processes described herein. For example, program code may be stored in memory 220 and executed by the processor 214. Memory 220 may be implemented within or external to the processor 214.

If implemented in firmware 218 and/or processor 214 with software 222, the functions may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, Flash Memory, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The mobile platform 200 may include an optional user interface 212 which provides any suitable interface systems, such as a microphone/speaker 234, keypad 236, and display 238 that allows user interaction with the mobile platform 200. The microphone/speaker 234 provides for voice communication services using the wireless transceiver 202. The keypad 236 comprises any suitable buttons for user input. The display 238 comprises any suitable display, such as, for example, a backlit LCD display, and may further include a touch screen display for additional user input modes.

In one aspect, the mobile platform 200 is configured to determine a position of the mobile platform 200 by combining the SPS measurements 246 with the VIO velocity measurements 248 to improve accuracy of the position determination. However, as mentioned above, the SPS measurements 246 may be with respect to a global reference frame 126, while the VIO velocity measurements 248 are with respect to a local reference frame 130. Thus, in order to combine the SPS measurements 246 with the VIO velocity measurements 248, the mobile platform 200 may first align the local reference frame 130 with the global reference frame 126. In one aspect, the positioning module 228 of control unit 210 is configured to determine an orientation parameter, such as a rotation matrix, to align the local reference frame 130 with the global reference frame 126. In one example, the positioning module 228 determines the orientation parameter based on the SPS measurements 246 and the VIO velocity measurements 248. Two approaches to perform this estimation are provided below, one where the estimation of the orientation parameter is based on SPS velocity measurements obtained from the SPS 208, and another approach where the estimation is based on raw range-rate measurements also obtained from the SPS 208.

As mentioned above, the SPS measurements 246 obtained from SPS 208 may include SPS velocity measurements of the mobile platform 200. In a first approach, both SPS and VIO velocity measurements are accumulated over time, such that a "best" rotation matrix may be determined that matches the SPS velocity measurements with the VIO velocity measurements. In this example, the SPS velocity measurements may be used, since, in an open-sky condition, the SPS velocity measurements may contain relatively small estimation errors (e.g., 0:1 m/s), which in turn allows positioning module 228 to determine a very reliable estimate of the orientation parameter.

Alternatively, the SPS measurements 246 obtained from the SPS 208 may include range-rate measurements, such as GPS Doppler range-rate measurements. Thus, the positioning module 228 may determine the orientation parameter directly from the range-rate measurements without explicitly having to have the mobile platform 200 solve for the SPS velocities. In one aspect, this allows the mobile platform 200 to determine the orientation parameter even if insufficient range-rate measurements are available to solve for the SPS velocity. That is, in this example, the number of range-rate measurements used by the positioning module 228 to determine the orientation parameter may be less than is required to calculate the SPS velocity of the mobile platform 200.

Aspects of aligning the local reference frame with a global reference frame, discussed in detail below combines a quaternion reformulation of the problem together with a semidefinite relaxation technique that can provide a significant performance improvement.

Figure 3:
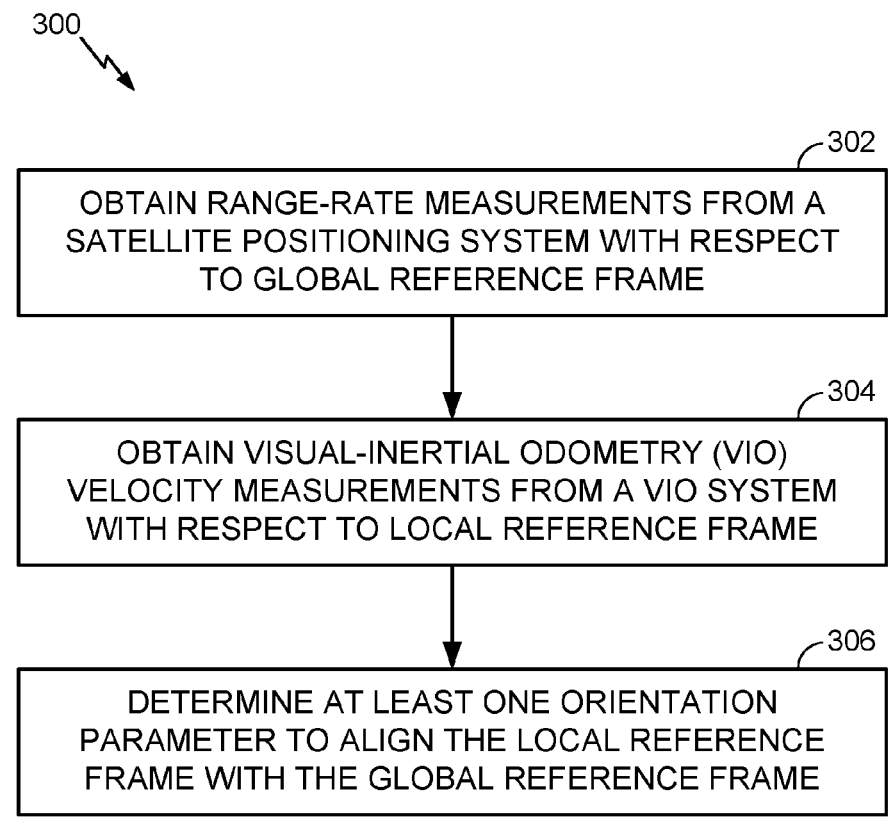
FIG. 3 illustrates an example process of aligning a visual-inertial odometry (VIO) reference frame with a satellite positioning system (SPS) reference frame, according to one aspect of the disclosure.

FIG. 3 illustrates an example process 300 of aligning a visual-inertial odometry (VIO) reference frame with a satellite positioning system (SPS) reference frame, according to one aspect of the disclosure. In process block 302, positioning module 228 obtains range-rate measurements 246 from SPS 208, where the range-rate measurements are with respect to a global reference frame 126. In one aspect, the SPS 208 provides the raw range-rate measurements from different satellites during each epoch of a length of one second. The tropospheric, ionospheric, and satellite clock biases may be assumed to be corrected in these range-rate measurements, either through standard modules used in single-point solutions or from network data. The corrected range-rate measurements may be modeled as:

$$\dot{\rho}_s(t) \triangleq \nabla_s^T(t)(v(t)-v_s(t))+\dot{b}(t)+w_s(t) \qquad \text{EQ (1)}$$

where, $$\nabla_s(t) \triangleq \frac{(\tilde{x}(t)-x_s(t))}{\|\tilde{x}(t)-x_s(t)\|} \qquad \text{EQ (2)}$$

is the unit vector from the satellite s (e.g., satellite 102a) to a coarse estimate x̃(t) of the mobile platform 200 position x(t). v(t) and $v_s$(t) are velocities of the mobile platform 200 and the satellite s, respectively, ḃ(t) is the receiver clock drift of SPS 208, and $w_s$(t) captures all other noise in the measurements. Such a course position estimate, accurate to within, e.g., 200m, can be computed using standard models.

Next, in process block 304, the positioning module 228 obtains VIO velocity measurements 248 from VIO system 226, where the VIO velocity measurements 248 are with respect to a local reference frame 130. The VIO system 226 may utilize the images 244 generated by camera 204 as well as data provided by one or more of the motion sensors 206 (e.g., accelerometer and gyroscope) to generate VIO velocity measurements 248. The VIO velocity measurements 248 generated by the VIO system 226 may be a vector of velocities and rotation matrices at each time instant along with estimates of the variances. The rate at which the VIO velocity measurements 248 are generated by VIO system 226 may be around 100 per second, which is much higher than the rate of the SPS measurements 246 generated by SPS 208, which is around 1 per second. The rotation matrices included in the VIO velocity measurements 248 describe the camera 204 orientation at the current time instant with respect to an initial camera reference frame. In some aspects, the VIO velocity measurements 248 are very accurate and have a drift of around 1% as a function of distance, i.e., an error of 1 m over 100 m.

The VIO system 226 provides the positioning module 228 with VIO velocity measurements 248 in the local reference frame 130 that may be arbitrarily chosen at system startup. In order to integrate the VIO velocity measurements 248 with the SPS measurements 246, positioning module 228 determines at least one orientation parameter (e.g., estimates a rotation matrix) to align the local reference frame 130 with the global reference frame 126 (i.e., process block 306). In one aspect, aligning the local reference frame 130 with the global reference frame 126 includes translating the VIO velocity measurements 248 into the global reference frame 126. To estimate the orientation parameter, such as the rotation matrix, positioning module 228 obtains the SPS measurements 246 in the global reference frame 126 that relate to the VIO velocity measurements 248 in the local reference frame 130. In one aspect, range-rate measurements (e.g., Doppler range-rate measurements) obtained from the SPS 208 can be used for this purpose. Once the orientation parameter (e.g., rotation matrix) is determined, the VIO velocity measurements 248 can be translated into the global reference frame as will be described below.

As mentioned above, in one aspect, the GPS measurements 246 provided by the SPS 208 may include SPS velocity measurements (e.g., GPS Doppler velocity measurements) that are representative of a velocity of the mobile platform 200. When mobile platform 200 is in an open-sky environment using the SPS velocity measurements are relatively accurate. Using the SPS velocity measurements to determine the orientation parameter may provide a closed-form solution. Furthermore, the orientation parameter may not change significantly over time, as in the case of a vehicle, where changes in the orientation parameter may be mainly due to a slow drift associated with the VIO system 226 as well as possible resets of the reference frame used by the VIO system 226. Thus, utilizing the SPS velocity measurements may be used by mobile platform 200 whenever good quality SPS velocity measurements are available from SPS 208.

Continuing with this example, let v(t) equal the true velocity of mobile platform 200 in the global reference frame 126, let $v_G$(t) equal the SPS velocity measurement 246 from the SPS 208, and let $v_v$(t) equal the VIO velocity measurement 248 obtained from the VIO system 226. Thus, these parameters may be modeled as $$v_G(t) \triangleq v(t) + z_G(t),$$

$$v_V(t) \triangleq Rv(t) + z_V(t) \quad \text{EQ (3a)}$$

where, R is the rotation matrix relating the global and local reference frames and where the respective noises in the measurements are denoted by $z_G$(t) and $z_v$(t). In one aspect, positioning module 228 estimates the rotation matrix R over a window size of T. For example, consider a set of measurements in the time interval {t−T+1, t−T+2, . . . t}. This expression assumes for ease of notation that time is discretized into units of seconds. Equations 3a may then be rewritten over this window as follow, $$V_G = V + Z_G,$$

$$V_V = RV + Z_V \quad \text{EQ (3b)}$$

where $V \triangleq (v(t-T+1), \ldots, v(t))$, and the matrices $V_G$, $V_V$, $Z_G$, $Z_V$ are defined analogously. The positioning module 228 may then estimate the rotation matrix R as the minimizer of the following least-squares optimization problem, $$\underset{Q \in \mathbb{R}^{3 \times 3}}{\text{minimize}} \|QV_G - V_V\|_F^2 \quad \text{EQ (3c)}$$

$$\text{subject to} \quad \begin{aligned} Q^T Q &= I, \\ \det(Q) &= 1, \end{aligned}$$

where $\|.\|_F$ denotes the Frobenius norm. In one aspect, this problem is a special case of the orthogonal Procrustes problem, where the Kabsch algorithm may provide an optimal closed-form solution, as follows:

$$U_1 \Sigma U_2^T \triangleq svd(V_V V_G^T) \quad \text{EQ (3d)}$$

$$d \triangleq \text{sign}(\det(U_2 U_1^T)),$$

$$\hat{R} = U_2 \begin{pmatrix} 1 & 0 & 0 \\ 0 & 1 & 0 \\ 0 & 0 & d \end{pmatrix} U_1^T,$$

where svd denotes the singular value decomposition and det the determinant.

The Kabsch algorithm can be extended to minimize the weighted Frobenius norm $\|(QV_G - V_V)W^{1/2}\|_F^2$ for some symmetric positive-semidefinite matrix W by computing equation 3e as follows:

$$U_1 \Sigma U_2^T \triangleq svd(V_V W V_G^T). \quad \text{EQ (3e)}$$

The remainder of the Kabsch algorithm stays as before. This weighted version of the Kabsch algorithm can be used as a building block for an iteratively reweighted least-squares procedure. Here, positioning module 228 may start with W=I and then compute a first estimate R̂ of the rotation matrix R. Using this estimate, the positioning module 228 then computes the residuals $\hat{R}V_G - V_V$. From these residuals, the positioning module 228 may compute a new weight matrix W. For example, a standard bisquare weight function can be used for this purpose. Positioning module 228 may repeat this calculation (e.g., 5 times). This iteratively reweighted least-squares approach downweights measurements with large residuals, thereby providing robustness to outliers.

The above approach of determining an orientation parameter for aligning the local reference frame 130 with the global reference frame 126 described above with reference to equations 1-3e utilizes the SPS velocity measurements included in the SPS measurements 246. This approach performs well when the SPS 208 has access to enough good quality range-rate measurements to solve for the SPS velocities (e.g., GPS Doppler velocity). However, when mobile platform 200 is located in challenging environments where a significant number of outliers are present, there may not be enough range-rate measurements to explicitly estimate the SPS velocities. To deal with this scenario, the positioning module 228 may be configured to estimate the orientation parameter (e.g., rotation matrix) by using the available range-rate measurements directly (i.e., without using the SPS velocity). As a result, the following approach can be utilized by the positioning module 228 to align the local reference frame 130 with the global reference frame 126 even if fewer than the necessary number (e.g., 4) range-rate measurements needed to solve for the SPS velocity are available in a time epoch.

For example, consider a pair of range rate measurements from satellites s and s' (e.g., satellites 102a and 102b, respectively) at the same time epoch t. Next, the modified single difference is formed as:

$$\dot{y}_{ss'}(t) \triangleq \dot{\rho}_s(t) - \dot{\rho}_{s'}(t) + \nabla_s^T(t)v_s(t) - \nabla_{s'}^T(t)v_{s'}(t) \quad \text{EQ (3f)}$$

From equation (1) above, the modified single difference of equation 3(f) satisfies:

$$\dot{y}_{ss'}(t) = \nabla_{ss'}^T(t)v(t) + w_s(t) - w_{s'}(t) \quad \text{EQ (4)}$$

with, $$\nabla_{ss'}(t) \triangleq \nabla_s(t) - \nabla_{s'}(t) \quad \text{EQ (5a)}$$

In addition to the modified single difference of equation 3(f), also available are the VIO velocity estimates $v_V(t)$ as defined above with equation (3a).

The rotation matrix R can then be estimated by the positioning module 228 as the minimizer of the following least-square problem:

$$\underset{Q \in \mathbb{R}^{3 \times 3}}{\text{minimize}} \sum_t \sum_{s' \neq s} |\dot{y}_{ss'}(t) - \nabla_{ss'}^T(t) Q^T v_V(t)|^2, \quad \text{EQ (5b)}$$

$$\text{subject to } \begin{matrix} Q^T Q = I, \\ \det(Q) = 1, \end{matrix}$$

The least-square problem of equation (5b) may be well defined even if the number of satellites is not sufficient to solve for the SPS velocities $v_G(t)$ for a particular time epoch t.

Unlike the approach described above utilizing the estimated SPS velocities, the least-squares problem of equation (5b) has no closed-form solution. Instead, iterative numerical methods may be applied to solve it. To this end, rather than solving directly for the orthogonal matrix $Q \in \mathbb{R}^{3 \times 3}$, positioning module 228 may instead solve for the quaternion $q \in \mathbb{R}^4$ that corresponds to it. Formally, this quaternion parametrization associates with each four-dimensional unit-norm vector q, the rotation matrix:

$$Q(q) \triangleq \begin{pmatrix} q_1^2 + q_2^2 - q_3^2 - q_4^2 & 2(q_2 q_3 - q_1 q_4) & 2(q_2 q_4 + q_1 q_3) \\ 2(q_2 q_3 + q_1 q_4) & q_1^2 - q_2^2 + q_3^2 - q_4^2 & 2(q_3 q_4 - q_1 q_2) \\ 2(q_2 q_4 - q_1 q_3) & 2(q_3 q_4 - q_1 q_2) & q_1^2 - q_2^2 - q_3^2 + q_4^2 \end{pmatrix}. \quad \text{EQ (6)}$$

This parameterization is two-to-one, meaning that every unit vector q corresponds a unique rotation matrix Q(q) and to every rotation matrix $\tilde{Q}$ correspond exactly two unit vectors q and −q, such that $Q(q) = Q(-q) = \tilde{Q}$.

The above least-squares problem can then be rewritten equivalently as:

$$\underset{q \in \mathbb{R}^4}{\text{minimize}} \sum_t \sum_{s' \neq s} |\dot{y}_{ss'}(t) - \nabla_{ss'}^T(t) Q^T(q) v_V(t)|^2, \quad \text{EQ (7)}$$

$$\text{subject to } q^T q = 1.$$

The estimate $\hat{R}$ of the rotation matrix R can then be constructed from the minimizer $\hat{q}$ of equation (7) by setting $\hat{R} \triangleq Q(\hat{q})$.

In one aspect, the positioning module 228 may then solve the nonlinear problem of equation (7) using an iterative local optimization method. This approach may work well if initialized in the neighborhood of the correct solution. However, the problem of equation (7) may exhibit multiple local minima, and with a randomly chosen starting point, positioning module 228 may frequently converge to one of those local minimizers instead of attaining the global optimum. To alleviate this problem, in some examples, the positioning module 228 may utilize a semidefinite relaxation that can be used as a starting point for the local minimization.

For example, note that from equation 6 that the term $\nabla_{ss'}^T(t) Q^T(q) v_V(t)$ in equation (7) is quadratic in q. This can be seen more explicitly by rewriting this term as:

$$\nabla_{ss'}^T(t) Q^T(q) v_V(t) = q^T W_{ss'}(t) q \quad \text{EQ (8a)}$$

with, $$W_{ss'}(t) \triangleq A_{ss'}(t) B_{ss'}(t), \quad \text{EQ (8b)}$$

$$A_{ss'}(t) \triangleq \begin{pmatrix} 0 & a_1 & a_2 & a_3 \\ -a_1 & 0 & -a_3 & a_2 \\ -a_2 & a_3 & 0 & -a_1 \\ -a_3 & -a_2 & a_1 & 0 \end{pmatrix},$$

$$B_{ss'}(t) \triangleq \begin{pmatrix} 0 & -b_1 & -b_2 & -b_3 \\ b_1 & 0 & -b_3 & b_2 \\ b_2 & b_3 & 0 & -b_1 \\ b_3 & -b_2 & b_1 & 0 \end{pmatrix},$$

where to simply notation $a \triangleq \nabla_{ss'}(t)$ and $b \triangleq v_V(t)$. The identity of equation (8a) can be derived by quaternion manipulations, but can also be verified by direct comparison of the matric equations. The optimization problem of equation (7) can thus be expressed equivalently as, $$\underset{q \in \mathbb{R}^4}{\text{minimize}} \sum_t \sum_{s' \neq s} |\dot{y}_{ss'}(t) - q^T W_{ss'}(t) q|^2, \quad \text{EQ (9a)}$$

$$\text{subject to } q^T q = 1.$$

-continued $$\text{Now, } q^T W_{ss'}(t) q = tr(q^T W_{ss'}(t) q) \quad \text{EQ (9b)}$$
$$= tr(qq^T W_{ss'}(t))$$
$$= tr(P W_{ss'}(t))$$

where $P \triangleq qq^T$. Similarly, $q^T q = tr(P)$.

Thus, it may be observed that $\tilde{P}$ is a symmetric, positive semidefinite, rank-one matrix. Moreover, if a matrix $\tilde{P}$ is symmetric, positive semidefinite, and rank one, then its eigendecomposition yields $\tilde{P} = udu^T$ with $\|u\| = 1$. If further $tr(\tilde{P}) = 1$, then $$1 = tr(\tilde{P}) \quad \text{EQ (9c)}$$
$$= tr(udu^T)$$
$$= tr(u^T u d)$$
$$= d,$$

so that $\tilde{P} = uu^T$ for some unit norm vector u. Thus, the minimization problem of equation (9a) may be rewritten in the equivalent form, $$\underset{P \in \mathbb{R}^{4 \times 4}}{\text{minimize}} \sum_{t} \sum_{s' \neq s} |\hat{y}_{ss'}(t) - tr(P W_{ss'}(t))|^2, \quad \text{EQ (10)}$$

subject to $P \succeq 0$, $tr(P) = 1$, rank $(P) = 1$, where the minimization is over all symmetric, positive semidefinite matrices $P \in \mathbb{R}^{4 \times 4}$, which is expressed symbolically as $P \succeq 0$.

One difficulty in the minimization of equation 10 may be the nonconvex rank constraint. The semidefinite relaxation of this minimization problem is to remove this rank constraint. The relaxed problem may then be expressed as, $$\underset{P \in \mathbb{R}^{4 \times 4}}{\text{minimize}} \sum_{t} \sum_{s' \neq s} |\hat{y}_{ss'}(t) - tr(P W_{ss'}(t))|^2, \quad \text{EQ (11)}$$

subject to $P \succeq 0$, $tr(P) = 1$,

The relaxed problem of equation 11 is convex and can be solved efficiently and optimally using for example interior-point methods. Once the global optimizer P of equation (11) has been found, the positioning module 228 can extract a unit norm vector $\tilde{q}$ from it by computing the eigenvector of P corresponding to its largest eigenvalue. This unit norm vector $\tilde{q}$ can then be used by the positioning module 228 as an initial solution for a local iterative optimization procedure for the exact problem of equation 7.

In some aspects, the approach described above of estimating the rotation matrix R may be tightly coupled with outlier-detection algorithms, where the positioning module 228 may iteratively find good quality range-rate measurements and then compute the rotation matrix.

Once the positioning module 228 has computed the estimate $\hat{R}$ of the rotation matrix R, the VIO velocity measurements 248 can now be oriented (e.g., translated) into the global reference frame 126. Note, that with GPS, the SPS measurements 246 are typically obtained every one second, while the VIO velocity measurements 248 are obtained at a much higher frequency. For outlier-detection, the displacement information between two time epochs is of interest. For example, let x(t) be the mobile platform 200 location at time epoch t. The displacement between two epochs t−1 and t may be given by, $$\Delta x(t-1) \triangleq x(t) - x(t-1), \quad \text{EQ (12)}$$
$$\approx \sum_{i: \tau_i \in [t-1, t)} (\tau_i - \tau_{i-1}) v(\tau_i)$$
$$\approx \sum_{i: \tau_i \in [t-1, t)} (\tau_i - \tau_{i-1}) \hat{R} v_V(\tau_i).$$

Figure 4:
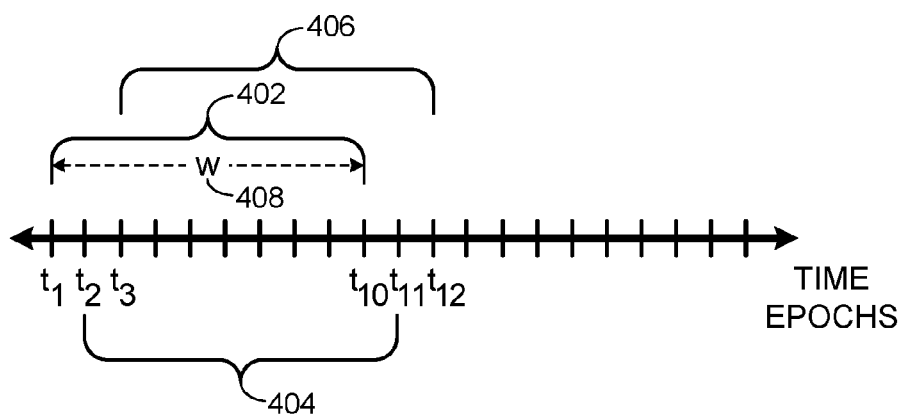
FIG. 4 illustrates a sliding window of time with respect to multiple time epochs, according to one aspect of the disclosure.

In some applications, the positioning module 228 is configured to recompute the orientation parameter (e.g., rotation matrix) at regular intervals since the local reference frame 130 can change (e.g., in VIO based systems the reference frame can reset or drift over time). Hence, certain aspects include the positioning module 228 determining the orientation parameter in a continuous fashion using a sliding window of time. FIG. 4 illustrates a sliding window of time 402-406 with respect to multiple time epochs, according to one aspect of the disclosure. As shown in FIG. 4, the positioning module 228 may determine a first orientation parameter over a window of time 402 that extends from time epoch $t_1$ to time epoch $t_{10}$. The window of time for the next determination of the orientation parameter may then slide to window of time 404, where the positioning module 228 determines the orientation parameter using time epochs $t_2$ through $t_{11}$. Similarly, a third determination of the orientation parameter may be performed by utilizing the window of time 406 that extends between time epoch $t_3$ and $t_{12}$. Thus, the positioning module 228 obtains the VIO velocity measurements 248 and the SPS measurements 246 (e.g., range-rate measurements) over a sliding window of time such that the positioning module 228 may continuously determine the orientation parameter.

As shown in FIG. 4, the window of time 402 includes a size 408 that dictates the number of time epochs used by the positioning module 228 when determining the orientation parameter. In some aspects, the size 408 of the windows of time 402-406 can be made adaptive depending on the quality of measurements being obtained (e.g., line-of-sight scenarios vs multipath scenarios, etc.). In one example, the control unit 210 may determine the quality of the range-rate measurements based on a magnitude of movement of the mobile platform 200, where larger movements are determined to result in higher quality range-rate measurements. The higher the quality of the range-rate measurements the smaller the size 408 of the window of time.

Further, positioning module 228 may be configured to filter the SPS measurements 246 based on the quality of the SPS measurements 246 obtained from the SPS 208. That is, the range-rate measurements included in the SPS measurements 246 may be filtered based on their respective quality. By way of example, filtering the range-rate measurements may include discarding one or more range-rate measurements if their quality is too low (e.g., magnitude of movement of the mobile platform 200 is too small). In another example, filtering the range-rate measurements may include weighting one or more range-rate measurements based on their quality (range-rate measurements corresponding to higher magnitudes of movement may be more heavily weighted as compared to range-rate measurements corresponding to lower magnitudes of movement). In yet another example, control unit 210 and/or SPS 208 may determine whether a range-rate measurement is a non-line-of-sight measurement and if so, discard the range-rate measurement.

Figure 5:
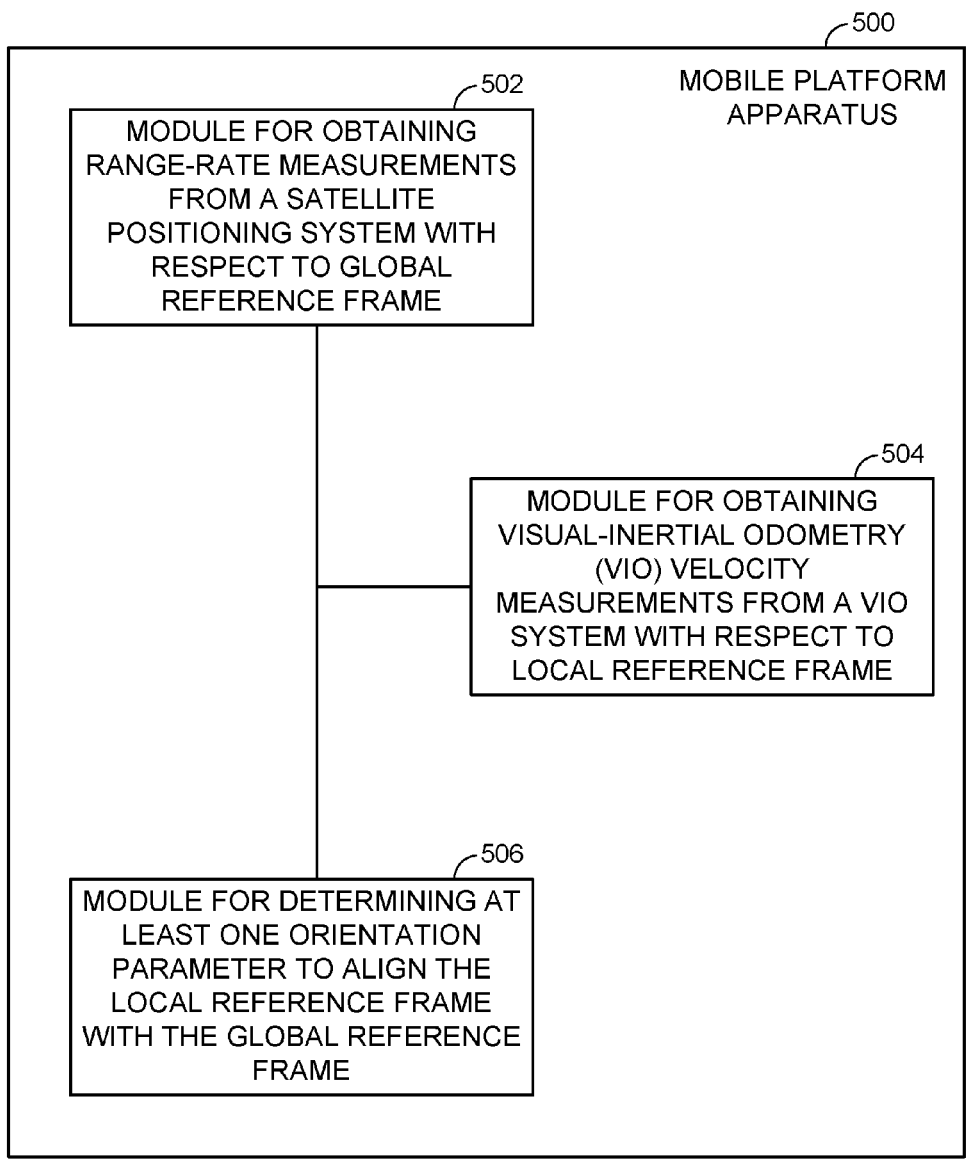
FIG. 5 illustrates several sample aspects of components that may be employed in a mobile platform configured to support the alignment of a visual-inertial odometry (VIO) reference frame with a satellite positioning system (SPS) reference frame as taught herein.

FIG. 5 illustrates several sample aspects of components that may be employed in a mobile platform apparatus 500 configured to support the alignment of a visual-inertial odometry (VIO) local reference frame with a satellite positioning system (SPS) global reference frame as taught herein. Mobile platform apparatus 500 is one possible implementation of mobile platform 108 of FIG. 1 and/or mobile platform 200 of FIG. 2.

A module 502 for obtaining range-rate measurements from a satellite positioning system with respect to a global reference frame may correspond at least in some aspects to, for example, a SPS 208 and/or positioning module 228 of FIG. 2. A module 504 for obtaining visual-inertial odometry (VIO) velocity measurements from a VIO system with respect to a local reference frame may correspond at least in some aspects to, for example, VIO system 226 and/or positioning module 228 of FIG. 2. A module 506 for determining at least one orientation parameter to align the local reference frame with the global reference frame may correspond at in some aspects to, for example, positioning module 228 and/or processor 214, of FIG. 2.

The functionality of the modules 502-506 of FIG. 5 may be implemented in various ways consistent with the teachings herein. In some designs, the functionality of these modules 502-506 may be implemented as one or more electrical components. In some designs, the functionality of these modules 502-506 may be implemented as a processing system including one or more processor components. In some designs, the functionality of these modules 502-506 may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIG. 5, as well as other components and functions described herein, may be implemented using any suitable means. Such means also may be implemented, at least in part, using corresponding structure as taught herein. For example, the components described above in conjunction with the "module for" components of FIG. 5 also may correspond to similarly designated "means for" functionality. Thus, in some aspects, one or more of such means may be implemented using one or more of processor components, integrated circuits, or other suitable structure as taught herein.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the present disclosure.

The various illustrative logical blocks, modules, and circuits described in connection with the aspects disclosed herein may be implemented or performed with a general purpose processor, a DSP, an ASIC, an FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The methods, sequences and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in an IoT device. In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes CD, laser disc, optical disc, DVD, floppy disk and Blu-ray disc where disks usually reproduce data magnetically and/or optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method, comprising:
   obtaining a plurality of satellite positioning system (SPS) measurements of a mobile platform from an SPS,
      wherein the plurality of SPS measurements are with respect to a global reference frame of the SPS,
      wherein the plurality of SPS measurements correspond to a plurality of time epochs, and
      wherein the plurality of SPS measurements include one or both of one or more SPS velocity measurements of the mobile platform, and a plurality of range-rate measurements of the mobile platform;
   obtaining a plurality of visual-inertial odometry (VIO) velocity measurements of the mobile platform from a VIO system,
      wherein the plurality of VIO velocity measurements are with respect to a local reference frame of the VIO system, and
      wherein the plurality of VIO velocity measurements correspond to the plurality of time epochs;
   determining at least one orientation parameter for at least one time epoch to align the local reference frame with the global reference frame based on the plurality of SPS measurements and the plurality of VIO velocity measurements; and
   determining a position of the mobile platform for the at least one time epoch based on a combination of the plurality of SPS measurements and the plurality of VIO velocity measurements.

2. The method of claim 1, further comprising:
   determining the one or more SPS velocity measurements of the mobile platform based on the plurality of range-rate measurements,
   wherein the at least one orientation parameter for the at least one time epoch is determined based on the one or more SPS velocity measurements and the plurality of VIO velocity measurements, and
   wherein the position of the mobile platform for the at least one time epoch is determined based on a combination of the one or more SPS velocity measurements and the plurality of VIO velocity measurements.

3. The method of claim 1, wherein when the plurality of range-rate measurements comprises a number of range-rate measurements that is less than required to calculate an SPS velocity of the mobile platform for the at least one time epoch,
   the at least one orientation parameter for the at least one time epoch is determined based on the plurality of range-rate measurements and the plurality of VIO velocity measurements, and
   the position of the mobile platform for the at least one time epoch is determined based on a combination of the plurality of range-rate measurements and the plurality of VIO velocity measurements.

4. The method of claim 1, wherein,
   obtaining the plurality of SPS measurements of the mobile platform from the SPS comprises obtaining the plurality of SPS measurements over a sliding window of time comprising a plurality of consecutive time epochs, and
   obtaining the plurality of VIO velocity measurements from the VIO system comprises obtaining the plurality of VIO velocity measurements over the sliding window of time,
   the method further comprising:
      continuously determining the at least one orientation parameter based on the plurality of SPS measurements and the plurality of VIO velocity measurements obtained over the sliding window of time; and
      continuously determining the position of the mobile platform based on the combination of the plurality of SPS measurements and the plurality of VIO velocity measurements obtained over the sliding window of time.

5. The method of claim 4, further comprising:
   adjusting a size of the sliding window of time based on a quality of the plurality of range-rate measurements.

6. The method of claim 5, further comprising:
   determining the quality of the plurality of range-rate measurements based on a magnitude of movement of the mobile platform.

7. The method of claim 1, further comprising:
   filtering the plurality of range-rate measurements based on a quality of the plurality of range-rate measurements.

8. The method of claim 7, wherein filtering the plurality of range-rate measurements comprises discarding one or more range-rate measurements from the plurality of range-rate measurements based on a quality of the one or more range-rate measurements.

9. The method of claim 7, wherein filtering the plurality of range-rate measurements comprises weighting one or more range-rate measurements of the plurality of range-rate measurements based on a quality of the one or more range-rate measurements.

10. The method of claim 1, further comprising:
    discarding one or more non-line-of-sight range-rate measurements from the plurality of range-rate measurements.

11. The method of claim 1, wherein determining the at least one orientation parameter to align the local reference frame with the global reference frame comprises:
    determining a rotation matrix between the local reference frame and the global reference frame; and
    translating the plurality of VIO velocity measurements into the global reference frame based on the rotation matrix.

12. An apparatus, comprising:
    means for obtaining a plurality of satellite positioning system (SPS) measurements of a mobile platform from an SPS,
       wherein the plurality of SPS measurements are with respect to a global reference frame of the SPS,
       wherein the plurality of SPS measurements correspond to a plurality of time epochs, and wherein the plurality of SPS measurements include one or both of one or more SPS velocity measurements of the mobile platform, and a plurality of range-rate measurements of the mobile platform;

means for obtaining a plurality of visual-inertial odometry (VIO) velocity measurements of the mobile platform from a VIO system, wherein the plurality of VIO velocity measurements are with respect to a local reference frame of the VIO system, and wherein the plurality of VIO velocity measurements correspond to the plurality of time epochs;

means for determining at least one orientation parameter for at least one time epoch to align the local reference frame with the global reference frame based on the plurality of SPS measurements and the plurality of VIO velocity measurements; and means for determining a position of the mobile platform for the at least one time epoch based on a combination of the plurality of SPS measurements and the plurality of VIO velocity measurements.

13. The apparatus of claim 12, further comprising:

means for determining the one or more SPS velocity measurements of the mobile platform based on the plurality of range-rate measurements, wherein the means for determining the at least one orientation parameter determines the at least one orientation parameter for the at least one epoch based on the one or more SPS velocity measurements and the plurality of VIO velocity measurements, and wherein the means for determining the position of the mobile platform determines the position of the mobile platform for the at least one time epoch based on a combination of the one or more SPS velocity measurements and the plurality of VIO velocity measurements.

14. The apparatus of claim 12, wherein when the plurality of range-rate measurements comprises a number of range-rate measurements that is less than required to calculate a SPS velocity of the mobile platform for the at least one time epoch, the means for determining the at least one orientation parameter determines the at least one orientation parameter for the at least one time epoch based on the plurality of range-rate measurements and the plurality of VIO velocity measurements, and the means for determining the position of the mobile platform determines the position of the mobile platform for the at least one time epoch based on a combination of the plurality of range-rate measurements and the plurality of VIO velocity measurements.

15. The apparatus of claim 12, wherein, the means for obtaining the plurality of SPS measurements of the mobile platform from the SPS obtains the plurality of range-rate measurements over a sliding window of time comprising a plurality of consecutive time epochs, and the means for obtaining the plurality of VIO velocity measurements from the VIO system obtains the plurality of VIO velocity measurements over the sliding window of time, means for determining the at least one orientation parameter continuously determines the at least one orientation parameter based on the plurality of SPS measurements and the plurality of VIO velocity measurements obtained over the sliding window of time, and the means for determining the position of the mobile platform continuously determines the position of the mobile platform based on the combination of the plurality of SPS measurements and the plurality of VIO velocity measurements obtained over the sliding window of time.

16. The apparatus of claim 15, further comprising means for adjusting a size of the sliding window of time based on a quality of the plurality of range-rate measurements.

17. The apparatus of claim 12, wherein the means for determining the at least one orientation parameter to align the local reference frame with the global reference frame comprises:

means for determining a rotation matrix between the local reference frame and the global reference frame; and means for translating the plurality of VIO velocity measurements into the global reference frame based on the rotation matrix.

18. An apparatus, comprising:

at least one processor; and at least one memory coupled to the at least one processor, the at least one processor and the at least one memory being configured to direct the apparatus to:

obtain a plurality of satellite positioning system (SPS) measurements of a mobile platform from an SPS, wherein the plurality of SPS measurements are with respect to a global reference frame of the SPS, wherein the plurality of SPS measurements correspond to a plurality of time epochs, and wherein the plurality of SPS measurements include one or both of one or more SPS velocity measurements of the mobile platform, and a plurality of range-rate measurements of the mobile platform;

obtain a plurality of visual-inertial odometry (VIO) velocity measurements of the mobile platform from a VIO system, wherein the plurality of VIO velocity measurements are with respect to a local reference frame of the VIO system, and wherein the plurality of VIO velocity measurements correspond to the plurality of time epochs;

determine at least one orientation parameter for at least one time epoch to align the local reference frame with the global reference frame based on the plurality of SPS measurements and the plurality of VIO velocity measurements; and determine a position of the mobile platform for the at least one time epoch based on a combination of the plurality of SPS measurements and the plurality of VIO velocity measurements.

19. The apparatus of claim 18, wherein the at least one processor and the at least one memory are further configured to direct the apparatus to:

determine the one or more SPS velocity measurements of the mobile platform based on the plurality of range-rate measurements, wherein determining the at least one orientation parameter for the at least one time epoch is based on the one or more SPS velocity measurements and the plurality of VIO velocity measurements, and wherein determining the position of the mobile platform for the at least one time epoch is based on a combination of the one or more SPS measurements and the plurality of VIO velocity measurements.

20. The apparatus of claim 18, wherein when the plurality of range-rate measurements comprises a number of range-rate measurements that is less than required to calculate an SPS velocity of the mobile platform for the at least one time epoch, determining the at least one orientation parameter for the at least one time epoch is based on the plurality of range-rate measurements and the plurality of VIO velocity measurements, and determining the position of the mobile platform for the at least one time epoch is based on a combination of the plurality of range-rate measurements and the plurality of VIO velocity measurements.

21. The apparatus of claim 18, wherein the at least one processor and the at least one memory are further configured to direct the apparatus to:
 obtain the plurality of SPS measurements over a sliding window of time comprising a plurality of consecutive time epochs;
 obtain the plurality of VIO velocity measurements over the sliding window of time;
 continuously determine the at least one orientation parameter based on the plurality of SPS measurements and the plurality of VIO velocity measurements obtained over the sliding window of time; and
 continuously determine the position of the mobile platform based on the combination of the plurality of SPS measurements and the plurality of VIO velocity measurements obtained over the sliding window of time.

22. The apparatus of claim 21, wherein the at least one processor and the at least one memory are further configured to direct the apparatus to adjust a size of the sliding window of time based on a quality of the plurality of range-rate measurements.

23. The apparatus of claim 18, wherein the at least one processor and the at least one memory are further configured to direct the apparatus to filter the plurality of range-rate measurements based on a quality of the plurality of range-rate measurements.

24. The apparatus of claim 18, wherein the at least one processor and the at least one memory are further configured to direct the apparatus to:
 determine a rotation matrix between the local reference frame and the global reference frame; and
 translate the plurality of VIO velocity measurements into the global reference frame based on the rotation matrix.

25. A non-transitory computer-readable storage medium having computer-executable instructions recorded thereon, wherein executing the computer-executable instructions on one or more processors causes the one or more processors to:
 obtain a plurality of satellite positioning system (SPS) measurements of a mobile platform from an SPS,
  wherein the plurality of SPS measurements are with respect to a global reference frame of the SPS,
  wherein the plurality of SPS measurements correspond to a plurality of time epochs, and
  wherein the plurality of SPS measurements include one or both of one or more SPS velocity measurements of the mobile platform, and a plurality of range-rate measurements of the mobile platform;
 obtain a plurality of visual-inertial odometry (VIO) velocity measurements of the mobile platform from a VIO system,
  wherein the plurality of VIO velocity measurements are with respect to a local reference frame of the VIO system, and
  wherein the plurality of VIO velocity measurements correspond to the plurality of time epochs;
 determine at least one orientation parameter for at least one time epoch to align the local reference frame with the global reference frame based on the plurality of SPS measurements and the plurality of VIO velocity measurements; and
 determine a position of the mobile platform for the at least one time epoch based on a combination of the plurality of SPS measurements and the plurality of VIO velocity measurements.

26. The non-transitory computer-readable storage medium of claim 25, wherein executing the computer-executable instructions on the one or more processors causes the one or more processors to:
 determine one or more SPS velocity measurements of the mobile platform based on the plurality of range-rate measurements,
 wherein determining the at least one orientation parameter for the at least one time epoch is based on the one or more SPS velocity measurements and the plurality of VIO velocity measurements, and
 wherein determining the position of the mobile platform for the at least one time epoch is based on a combination of the one or more SPS velocity measurements and the plurality of VIO velocity measurements.

27. The non-transitory computer-readable storage medium of claim 25, wherein when the plurality of range-rate measurements comprises a number of range-rate measurements that is less than required to calculate an SPS velocity of the mobile platform for the at least one time epoch, executing the computer-executable instructions on the one or more processors causes the one or more processors to:
 determine the at least one orientation parameter for the at least one epoch time based on the plurality of range-rate measurements and the plurality of VIO velocity measurements, and
 determine the position of the mobile platform for the at least one time epoch based on a combination of the plurality of range-rate measurements and the plurality of VIO velocity measurements.

28. The non-transitory computer-readable storage medium of claim 25, wherein executing the computer-executable instructions on the one or more processors causes the one or more processors to:
 obtain the plurality of SPS measurements over a sliding window of time comprising a plurality of consecutive time epochs;
 obtain the plurality of VIO velocity measurements over the sliding window of time;
 continuously determine the at least one orientation parameter based on the plurality of SPS measurements and the plurality of VIO velocity measurements obtained over the sliding window of time; and
 continuously determine the position of the mobile platform based on the combination of the plurality of SPS measurements and the plurality of VIO velocity measurements obtained over the sliding window of time.

29. The non-transitory computer-readable storage medium of claim 28, wherein executing the computer-executable instructions on the one or more processors causes the one or more processors to adjust a size of the sliding window of time based on a quality of the plurality of range-rate measurements.

30. The non-transitory computer-readable storage medium of claim 25, wherein executing the computer-executable instructions on the one or more processors causes the one or more processors to:
 determine a rotation matrix between the local reference frame and the global reference frame; and translate the plurality of VIO velocity measurements into the global reference frame based on the rotation matrix.

31. The method of claim 1, wherein the position of the mobile platform is determined based on the combination of the plurality of SPS measurements and the plurality of VIO velocity measurements at each time epoch.

32. The apparatus of claim 12, wherein the means for determining the position of the mobile platform determines the position of the mobile platform based on the combination of the one or more SPS velocity measurements and the plurality of VIO velocity measurements at each time epoch.

33. The apparatus of claim 18, wherein the at least one processor and the at least one memory are further configured to direct the apparatus to determine the position of the mobile platform based on the combination of the one or more SPS measurements and the plurality of VIO velocity measurements at each time epoch.

34. The non-transitory computer-readable storage medium of claim 25, wherein executing the computer-executable instructions on the one or more processors causes the one or more processors to determine the position of the mobile platform based on the combination of the one or more SPS velocity measurements and the plurality of VIO velocity measurements at each time epoch.

\* \* \* \* \*